US012568271B2

(12) United States Patent
Liu et al.

(10) Patent No.: US 12,568,271 B2
(45) Date of Patent: Mar. 3, 2026

(54) USER AWARE AUTOMATED CONTENT CAPTURE AND AUGMENTATION

(71) Applicant: INTERDIGITAL MADISON PATENT HOLDINGS, SAS, Paris (FR)

(72) Inventors: Lu Liu, Conshohocken, PA (US); Dale Seed, Allentown, PA (US); Paul Dougherty, Springfield, PA (US); Sanghoon Kim, Chadds Ford, PA (US)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 84 days.

(21) Appl. No.: 18/560,293

(22) PCT Filed: May 17, 2022

(86) PCT No.: PCT/US2022/029581
§ 371 (c)(1),
(2) Date: Nov. 10, 2023

(87) PCT Pub. No.: WO2022/245788
PCT Pub. Date: Nov. 24, 2022

(65) Prior Publication Data
US 2024/0236404 A1     Jul. 11, 2024

Related U.S. Application Data

(60) Provisional application No. 63/190,518, filed on May 19, 2021.

(51) Int. Cl.
*H04N 21/433*     (2011.01)
*H04N 21/431*     (2011.01)
(Continued)

(52) U.S. Cl.
CPC ..... *H04N 21/4334* (2013.01); *H04N 21/4312* (2013.01); *H04N 21/44218* (2013.01); *H04N 21/8547* (2013.01)

(58) Field of Classification Search
CPC ........... H04N 21/4334; H04N 21/4312; H04N 21/44218; H04N 21/8547
See application file for complete search history.

(56) References Cited

U.S. PATENT DOCUMENTS

| | | | | |
|---|---|---|---|---|
| 9,336,268 B1 * | 5/2016 | Moudy | ................... | G06F 40/20 |
| 2003/0206710 A1 * | 11/2003 | Ferman | ................ | H04N 21/466 |
| | | | | 348/E7.069 |

(Continued)

FOREIGN PATENT DOCUMENTS

| | | |
|---|---|---|
| EP | 3726344 A1 | 10/2020 |
| WO | WO 2021046324 A1 | 3/2021 |

OTHER PUBLICATIONS

Steve Hodges et al, "SenseCam: a Retrospective Memory Aid", Jan. 1, 2006, arxiv.org, Cornell University Library, 201 Olin Library Cornell University, Ithaca, NY 14853, pp. 177-193.

(Continued)

*Primary Examiner* — Mishawn N. Hunter
(74) *Attorney, Agent, or Firm* — VOLPE KOENIG

(57)     ABSTRACT

A method performed by a first electronic device includes receiving from a second electronic device an indication of an occurrence of one or more trigger conditions for content capture of multimedia content displayed on the first device, starting capture of the multimedia content in response to the trigger condition indication, collecting information from a third device, wherein the information from the third device is response information that is related to the multimedia content displayed on the first device, augmenting the captured multimedia content with the collected information (Continued)

High-level Procedure of Proposed MCD Content Capture from the third device for simultaneous display, and displaying the augmented multimedia content.

20 Claims, 10 Drawing Sheets

(51) Int. Cl.
H04N 21/442 (2011.01)
H04N 21/8547 (2011.01)

(56) References Cited

U.S. PATENT DOCUMENTS

| | | | | |
|---|---|---|---|---|
| 2009/0150939 | A1* | 6/2009 | Drucker | G11B 27/11 |
| | | | | 725/59 |
| 2010/0171846 | A1 | 7/2010 | Wood et al. | |
| 2015/0220537 | A1 | 8/2015 | Cosgrove et al. | |
| 2015/0223731 | A1* | 8/2015 | Sahin | A61B 5/16 |
| | | | | 600/595 |
| 2016/0055879 | A1 | 2/2016 | Arai et al. | |
| 2017/0142481 | A1* | 5/2017 | Caruana | H04N 21/233 |
| 2017/0195435 | A1 | 7/2017 | Sarukkai et al. | |
| 2017/0339020 | A1* | 11/2017 | Khanna | G06Q 30/02 |
| 2018/0315076 | A1* | 11/2018 | Andreou | G06Q 30/0241 |
| 2020/0082436 | A1 | 3/2020 | Garcia | |
| 2021/0014579 | A1 | 1/2021 | Newell et al. | |
| 2021/0150219 | A1 | 5/2021 | Karoui et al. | |
| 2021/0274244 | A1* | 9/2021 | Wondra | H04N 21/2668 |
| 2022/0351218 | A1* | 11/2022 | Karri | G06N 20/00 |

OTHER PUBLICATIONS

Kyungmo Park: "The proposed update requirement of NBMP", 122. MPEG Meeting; Apr. 16, 2018-Apr. 20, 2018; San Diego; Motion Picture Expert Group or ISO/IEC JTC1/SC29/WH11), No. m42784, pp. 1, 5, 10, 11, 16, 17, 27, 28.

"Text on ISO/IEC FDIS 23001-Part 13: Media Orchestration", 121. MGEG Meeting; Jan. 22, 2018-Jan. 26, 208; Gwangju; (Motion Picture Expert Group or ISO/IEC JTC1/SC29/WG110, No. n17415 Apr. 21, 2018, pp. 12, 14, 15, 21, 28.

J. Sedmidubsky and P. Zezula, "Augmenting Spatio-Temporal Human Motion Data for Effective 3D Action Recognition," 2019 IEEE International Symposium on Multimedia (ISM), 2019, pp. 204-207.

* cited by examiner

High-level Procedure of Proposed MCD Content Capture

Content Capture and Augmentation Procedure – Option 1

Content Capture and Augmentation Procedure – Option 2

600

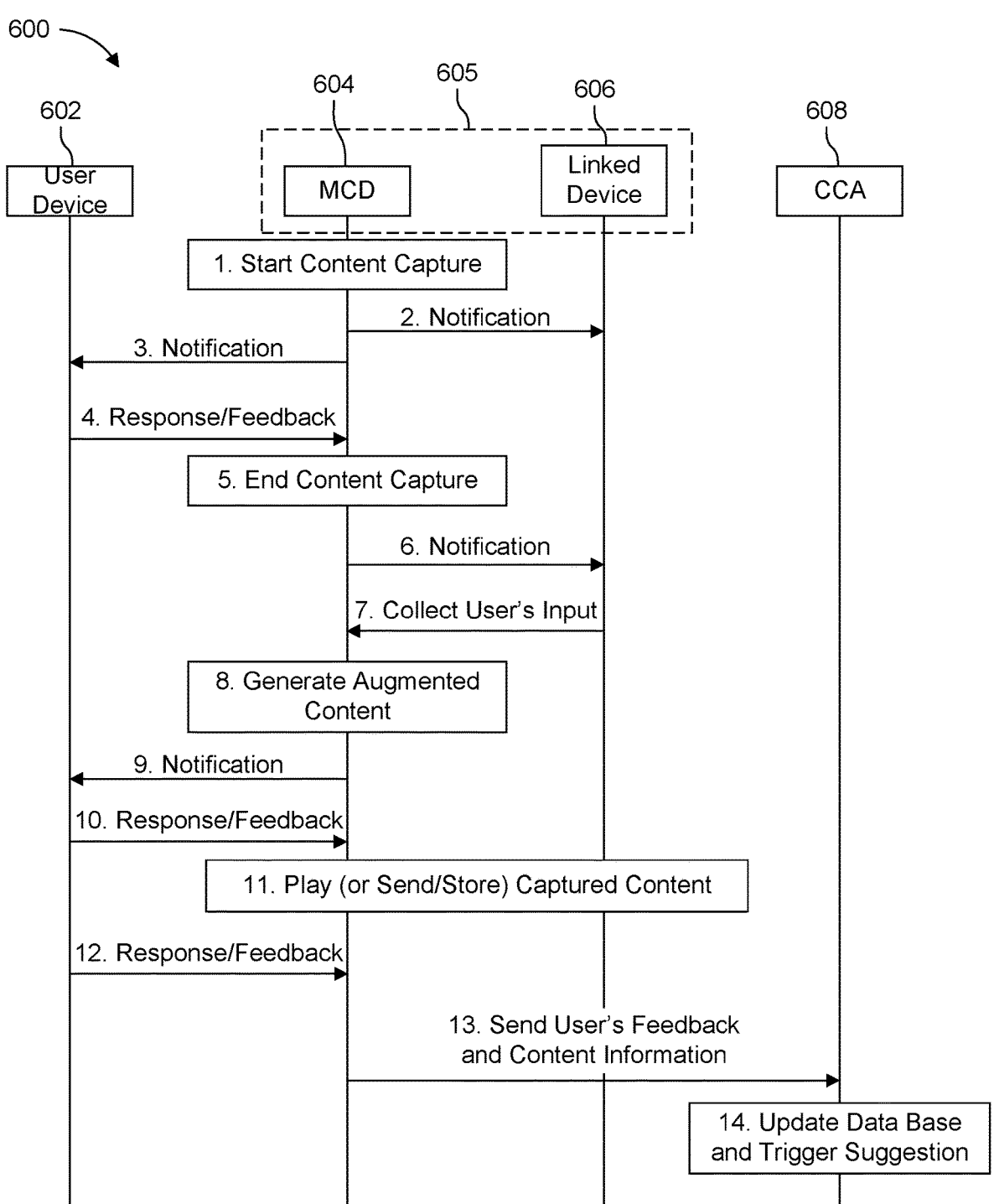

602 — User Device

604 — MCD

605

606 — Linked Device

608 — CCA

1. Start Content Capture

2. Notification

3. Notification

4. Response/Feedback

5. End Content Capture

6. Notification

7. Collect User's Input

8. Generate Augmented Content

9. Notification

10. Response/Feedback

11. Play (or Send/Store) Captured Content

12. Response/Feedback

13. Send User's Feedback and Content Information

14. Update Data Base and Trigger Suggestion

Content Capture and Augmentation Procedure – Option 3

FIG. 6

Content Capture and Augmentation Procedure – Option 4

System Level Embodiments

900

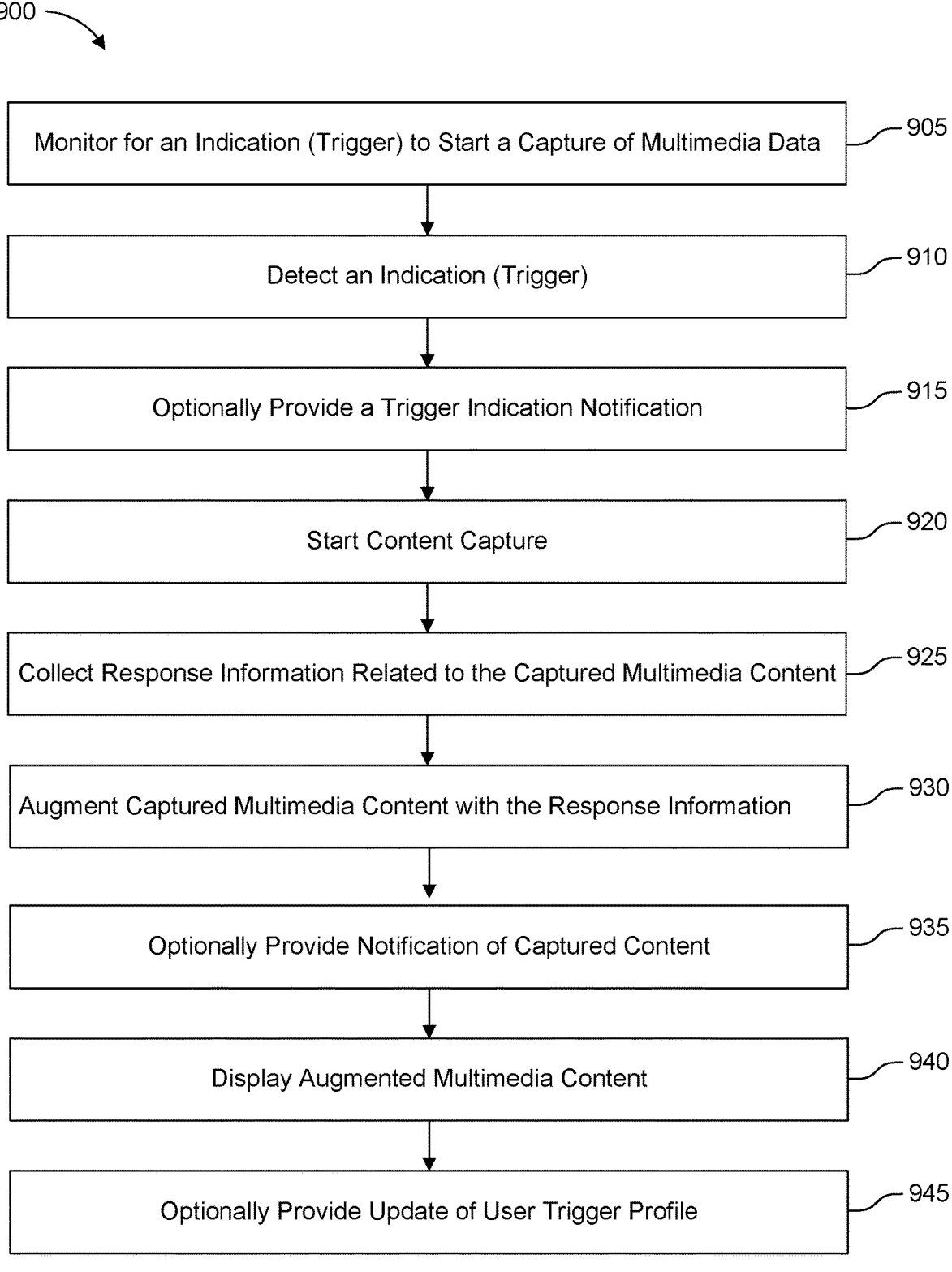

Monitor for an Indication (Trigger) to Start a Capture of Multimedia Data — 905

Detect an Indication (Trigger) — 910

Optionally Provide a Trigger Indication Notification — 915

Start Content Capture — 920

Collect Response Information Related to the Captured Multimedia Content — 925

Augment Captured Multimedia Content with the Response Information — 930

Optionally Provide Notification of Captured Content — 935

Display Augmented Multimedia Content — 940

Optionally Provide Update of User Trigger Profile — 945

Example Flow Diagram

FIG. 9

Example Device Architecture

FIG. 10

USER AWARE AUTOMATED CONTENT CAPTURE AND AUGMENTATION

CROSS REFERENCE TO RELATED APPLICATIONS

This application is a U.S. National Stage Application under 35 U.S.C. § 371 of International Patent Application of PCT/US2022/029581, filed 17 May 2022, which is incorporated herein by reference in its entirety and claims the benefit of U.S. provisional application No. 63/190,518, filed 19 May 2021, which is incorporated herein by reference in its entirety.

FIELD

The present principles relate to communications from digital television devices, specifically, they relate to methods and machines that provide content capture operations on behalf of a user.

BACKGROUND

There are existing technologies that enable a user to record or replay content from a display device. Some examples of these technologies include digital video recorder (DVR) and other video capture devices which could record video in a digital form and save to a storage device. A user may manually configure the device to start recording content of interest. Some recorders further provide the functionality of automatically recording a show or program that the user may be interested in. Some devices (e.g. gaming consoles) provide the feature of instant replay that could enable the user to capture a fixed length of video clip that is just played. Some devices provide the feature of automatic recording with content-based triggers such as facial recognition, image matching or other types of data matching.

The existing systems are deficient in capturing content that is relevant to a user's interest. The content capture feature of these systems either relies on the manual configuration of the user or is not tailored to the exact matching of the user's interest. There are systems that automatically capture content for users, but they do not consider dynamic information about the user, such as the user's current state or activity. Another problem is that, in situations where systems capture content while the user(s) is also viewing the content, existing systems fail to provide the user with a means for understanding the context of why the content was captured or the ability to navigate the captured content based on relevance.

In one example use case, a user may be temporarily away from the screen or not paying attention to the screen (e.g. answer the door, pick up the phone, etc.). The user may not have the time to start recording before leaving, and miss the content being played when he/she is away. In some cases, the user may be able to use a rewind function to make up the missing segment. However, since the user does not know the exact timestamp that he/she left, the user may have to try multiple times to manually locate the desired timestamp.

In a second example use case, a user may want to selectively record several segments/highlights from a relatively long video that most attracted his/her interests for later re-watching or sharing with friends. The user may pause the video each time he/she finds an interesting segment and record the segment by manually rewinding to a past timestamp where the segment started. Alternatively, the user may use the retroactive recording function to record the segment that is just played. However, such function only supports a fixed length of recording, which may not be the user's desired length.

In the above example two use cases, it can be seen that the current Media Consumption Devices (MCDs) are not capable of identifying what content the user may want to capture and automatically performing the content capture/recording. In other words, there is a lack of user awareness for content capture. An MCD may be defined as a consumer electronic device that could provide multimedia viewing experience to users (e.g., DTV, HMD, PC, tablets, smart phones) and is capable of capturing content being played. The MCD may have Internet connectivity that allows viewers to stream on-demand videos, online interactive media, over-the-top content, music, browse the internet, view photos, etc.

In a third example use case, a user is following a workout video while wearing a smart watch to track his/her heart rate. After the workout session, the user or his/her coach wants to check how the user's heart rate changes with the content of the video in order to decide how to adjust the content of the video. The user has to manually synchronize the video and the heart rate readings and match the timestamps from two devices.

In a fourth use case, a user is watching an online lecture while taking notes on his/her tablet. The lecturer talked about a key point and the user wrote down some texts to help understand this point. After the lecture, the user wants to generate a visual note as a collection of the key points, which includes the video clips containing the lecturer talking about the key points and the corresponding explanatory texts written down by the user. The user has to re-watch the entire recorded lecture and cut off the clips of interest, manually identify the text inputs associated with each video clip, and then overlay the clips with the texts.

As understood in the above examples, in many cases, a MCD user may perform activities on devices other than the MCD which are related to or affected by the content being played on the MCD. The user may want to associate their activity on other devices with the video they are watching and jointly capture the content of MCD and the input on the devices. As a result, it is desired that the MCD should be aware of users' activities or inputs on other devices that are related to the content being played on the MCD, identify and combine users' input from such activities with the MCD's content to achieve a joint content capture and augmentation. Augmenting captured content may include adding a user's input at the MCD or other devices.

SUMMARY

This summary is provided to introduce a selection of concepts in a simplified form as a prelude to the more detailed description that is presented later. The summary is not intended to identify key or essential features, nor is it intended to delineate the scope of the claimed subject matter.

In one embodiment, a method performed by a first electronic device includes receiving from a second electronic device an indication of an occurrence of one or more trigger conditions for content capture of multimedia content displayed on the first device, starting capture of the multimedia content in response to the trigger condition indication, collecting information from a third device, wherein the information from the third device is response information that is related to the multimedia content displayed on the first device, augmenting the captured multimedia content with the collected information from the third device for simultaneous display: and displaying the augmented multimedia content.

Additional features and advantages will be made apparent from the following detailed description of illustrative embodiments which proceeds with reference to the accompanying figures. The drawings are for purposes of illustrating the concepts of the disclosure and is not necessarily the only possible configuration for illustrating the disclosure. Features of the various drawings may be combined unless otherwise stated.

BRIEF DESCRIPTION OF THE DRAWINGS

The foregoing summary, as well as the following detailed description of illustrative embodiments, is better understood when read in conjunction with the accompanying drawings, which are included by way of example, and not by way of limitation with regard to the present principles. In the drawings, like numbers represent similar elements.

FIG. 6 depicts an example third option for content capture and augmentation;

FIG. 9 depicts an example flow diagram of a method according to aspects of the disclosure; and FIG. 10 depicts an example block diagram of a content capture device.

DETAILED DISCUSSION OF THE EMBODIMENTS

In the following description of various illustrative embodiments, reference is made to the accompanying drawings, which form a part thereof, and in which is shown, by way of illustration, how various embodiments may be practiced. It is to be understood that other embodiments may be utilized and structural and functional modification may be made without departing from the scope of the present principles.

A Media Consumption Device (MCD) user's activity is usually related to the content being displayed on the MCD or the user's viewing experience. As described briefly above, a user may want to capture the content of interest (e.g. recording, screenshot, etc.), and/or associate the content from the MCD with the corresponding activity, such as the user's input or user-generated information or user-derived information to the MCD or other devices. MCDs currently lack the capability of content capture based on such awareness of user's interest or user's activity.

In order to enable MCD's user awareness for content capture, an automated content capture feature is discussed herein which could be triggered by user's action, activity, input to various devices and/or other response information that may be user-generated or user-derived. The trigger could be configured by the user, or by the MCD which could learn the user's preference and tendency based on content capture history. Further, the feature of augmenting the content being displayed and/or captured with response information from other devices is proposed, which enables the MCD to associate user's activity with the content. The response information could be the user's input to various devices, or information that is actively or passively provided by the user at one or more devices, which is responsive or related to the content provided to the user. As used herein, response information is a form of user-generated or user-derived information.

Figure 1:
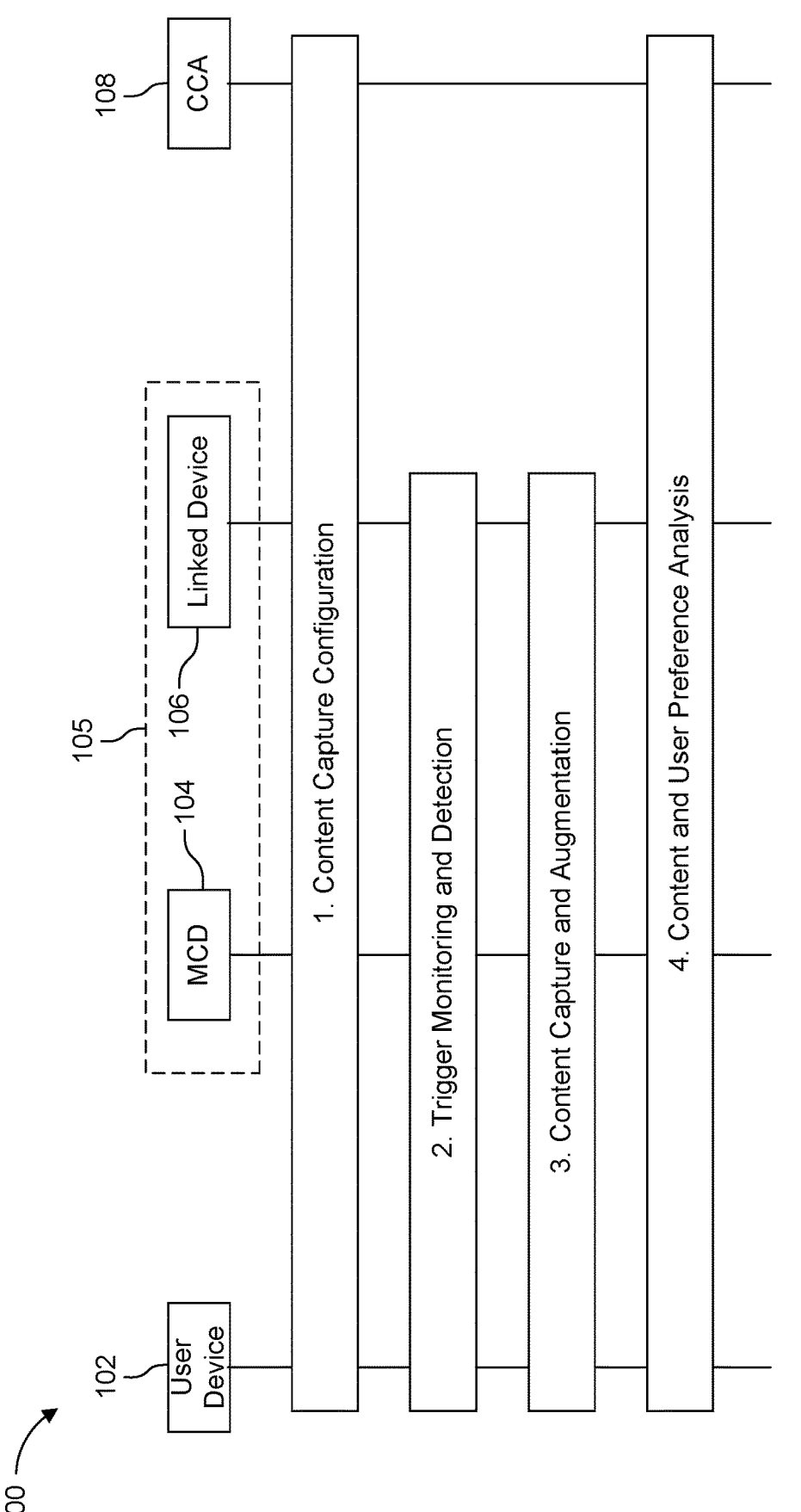
FIG. 1 depicts an example high-level procedure for content capture.

FIG. 1 depicts a high-level procedure 100 for proposed MCD content capture using a user aware automated content capture and augmentation function to address the shortcomings aforementioned. The proposed user aware content capture and augmentation functionality can be implemented as an application/service that is integrated in a MCD. The MCD may utilize locally available supporting capability, or interact with Linked Devices, and interact with a content capture analyzer (CCA) to get assistance in providing the functionality. A linked device may be a device other than the MCD that is involved in the content capture by providing trigger/notification for capture, or by providing response information to be augmented with captured content, or by acting as a display/storage device for the captured content. A CCA may be an entity with intelligence to collect information of content capture history, analyze the information, and generate content capture trigger suggestion based on the analysis. The descriptions for each entity and the high-level procedure are detailed in the following.

In FIG. 1, A Media Consumption Device (MCD) 104 may be defined as a consumer electronic device that provides multimedia viewing experience to a user and their device 102 and is capable of capturing (and augmenting) the content being played. Examples of MCDs include but are not limited to a digital television (DTV), head-mounted device (HMD), personal computer (PC), tablets, smart phones, and the like. The MCD may also be capable of providing supporting functionalities (e.g. sensing, text editing) that may assist the process of content capture and augmentation.

In the various figures, a user device, such as user device 102 in FIG. 1, is depicted. The user device may be any of a laptop, PC, tablet computer, call phone, and the like that is capable of receiving inputs from a user in order to communicate with a MCD and the rest of the system environment. The user device may also be equipped with a screen to display items such as multimedia content and applications.

In FIG. 1, the linked device 106 may be one or more devices other than the target MCD (the target MCD is the MCD that performs content capture, a linked device could be another MCD) that would be involved in and assisting the content capture. There are several ways that a device may be involved, and a linked device may be involved in more than one way. In some embodiments, a linked device 106 may be a sensor or other circuitry either as a standalone device or as a part/component of the MCD 104. In one possible embodiment, a MCD and a linked device may be coupled together and act as one device 105. A trigger event may be generated at the linked device 106. For example, a sensor functioning as a linked device could monitor the presence of the user or their device, generate a trigger when the user is absent and notify the MCD for recording. In FIG. 1, for example, response information may be received at the linked device 106 which will be integrated with the captured content. For example, a health monitoring device as a linked device could provide sensor readings as user input to be combined with the captured content. The captured content is sent to a linked device for display, processing, store or sharing. For example, the captured content may be sent to a linked tablet where the tablet may overlay the captured content with the user's input on the tablet and display the combined content to the user. Note that the involvement of the linked device 106 may be optional. The MCD may perform the entire content capture and augmentation process independently if the functionalities described to a linked device could be carried out by the MCD. In such an example in FIG. 1, the MCD 104 and linked device 106 may function together in one device 105.

In FIG. 1, the content capture analyzer 108 is an entity with intelligence to predict a user's preference and tendency of content capture. The CCA 106 may collect information of content capture history of the user(s) interacting with user device 102 of the target MCD 104 as well as other users. In addition, the CCA will collect user's feedbacks on the captured content, such as whether the user agrees with the capture, or whether the user likes the captured content. Based on the collected information, the CCA may make inferences such as what situations, conditions, and/or devices may trigger a content capture, what content is popular or the user is likely to capture, etc. For example, the user may always open a "note" app on the user's tablet when watching content labeled with "lecture", and records clips when there's input to the app. This inference may be based on an example statistic that 80% of users recorded the last 10 minutes when watching this show. The inference result will be suggested to the MCD as content capture triggers.

In an alternative to the configuration of FIG. 1, the CCA 108 could be integrated to the MCD 104 or to an external device that could interface with the MCD. Alternatively, the CCA could be instantiated as a cloud service. The CCA may interface with the target MCD as well as other MCDs through communication networks to collect the capture history or preference of the users. The CCA may also interface with the content provider servers to obtain information related to the users' preference.

Using the configuration of FIG. 1, at Step 1, a content capture configuration information may be shared by the MCD 104, the linked device 106 and the CCA 108 may include trigger and notification configurations. Content capture trigger configuration provides the MCD a trigger for automated content capture and augmentation. Based on the trigger condition, the MCD could identify the content that are of the users' interest and perform content capture such as recording and screenshot. The trigger could be configured by the user or suggested by a CCA. Based on the trigger, the MCD could further identify and contact linked devices that are involved in the content capture. Content capture notification configuration specifies how the user would like to be notified of the captured content. Different configurations may result in different methods that the MCD could interact with the user regarding the content capture.

In FIG. 1 at Step 2, based on the configured content capture trigger, the MCD 104 may monitor the corresponding conditions and events defined in the trigger, and determine whether a content capture should be performed. The content capture may be triggered when receiving a user's command, or a decision/detection made by the MCD, or receiving a notification from a linked device, or receiving user's inputs from the MCD or a linked device.

In FIG. at Step 3, when content capture is triggered, the MCD 104 may perform a recording or screenshot of the content. Content capture may include buffering or recording content using either a temporary or transient method, such as storage into a Random-Access Memory (RAM) buffer, or by a less transient storage method such as via a hard disc medium or other storage/recording medium known in the art. The captured content may be captured all or in part and may be further combined with the user's input from another device to generate the augmented captured content, such as a video clip overlaid with user's input. After the augmented captured content is generated, the MCD may notify the user, and optionally play the augmented clip to the user.

In FIG. 1 at Step 4, the user's response and feedback to the captured content received by the user device 102 and the information of content capture and augmentation are sent to the CCA 10. By analyzing the results, the CCA is able to learn the user's preference for content capture and feed this information to the MCD as trigger suggestions.

Information Elements

This section introduces the informational elements for the system that would apply to the main ideas and processes that are to be described in the following sections. The defined information elements will be applied in the messages that are exchanged between different entities in the system of FIG. 1 (e.g. a request sent from the user 102 to the MCD 104, a request sent from the MCD 104 to the CCA 108, a notification sent from the MCD 104 to the user 102).

Content Capture Trigger

The content capture trigger enables the MCD's automated content capture function by defining when and what content the MCD should capture. A content capture trigger could be defined by the user or generated by the CCA. Without loss of generality, video recording is used as an example to represent content capture in the rest of this disclosure (screenshot could be viewed as recording a single frame of a video). A content capture trigger contains the elements listed in Table 1.

TABLE 1

| Elements of Content Capture Trigger | |
| --- | --- |
| Element | Description |
| Applicability | Defines the applicability of the trigger, such as what content this trigger may apply to. Examples include "all content", "live content", "content with lecture-tag", "content in the category of sports", "content generated by the user". |
| | For example, the user may configure a physical presence/absence based trigger for all types of content, a status/activity based trigger for entertainment content, and an action/input based trigger only for "online lecture" type of content. |
| | The user may also define an applicable period for a trigger (e.g. daytime only, during a specific show). If a trigger relies on user/environmental monitoring, then the monitoring will be activated only during the designated time, which may help reduce resource utilization and facilitate privacy control. |

TABLE 1-continued

Elements of Content Capture Trigger

| Element | Description |
|---|---|
| Condition/Event | Defines the condition or event of this trigger. There could be various types of conditions or events that may trigger the content capture, as detailed later. |
| Linked Device | Defines the device related to this trigger. It could be the device that generates this trigger, or the device that provides input for this triggered capture, or the device used for displaying/processing the capture content associated with this trigger. One or more linked devices could be defined for each trigger. |
| Notification Setting | If the content capture associated with this trigger requires a specific notification configuration, it could be defined in this element. If this element is not specified, the notification configuration of the content capture associated with this trigger may follow a default setting. |
| Capture Setting | Defines how the content will be captured, such as the method for content capture (e.g. screenshot, recording video, recording audio track only, transforming recorded audio to transcript, etc.), the quality of the content capture (e.g. resolution, size), the starting and ending point of the capture/recording. For example, a recording could be set to start when the user leaves the screen, and end when the user is back. When a recording is triggered by user's laughing, the MCD may trace back a few seconds to start recording, and end recording when the laughter fades. For a user command-based trigger, this value could be specified by the user when inputting the command. |
| Augmentation Setting | Defines whether augmentation is needed and how to perform augmentation on the captured content and user's input. If the augmentation is to be performed at the MCD, then this element may define the methods of how to overlay the user's input to the captured content. For example, the user's text input could be overlaid onto the captured content as subtitles or text bubbles, the user's audio input could be combined with the audio track, the user's image/video input could be embedded to the captured video as picture-in-picture or screen splitting. If the augmentation is to be performed at the linked device, then this element may define how the captured content is sent to the linked device. For example, the MCD may send the captured image or video clip with the corresponding timestamp information so that the linked device could match the content with the user's input which may be response information that is user-derived or user-generated. |
| Display Setting | Defines where and how the (augmented) captured content is displayed. The captured content could be displayed at the MCD or a linked device (defined in the "Linked Device" element.) The content can be displayed exclusively at the screen of the MCD (or a linked device), or in a picture-in-picture/screen-splitting mode if the screen is also displaying other content. |

The Condition/Event of a content capture trigger could be based on (but not limited to) the following factors:

a. User command. The user may send a command to the MCD as the trigger of content capture. The command could be sent by operating the remote controller, voice command, etc. The command could be to record a desired segment of video, while the target video segment could be either yet to be played or already played (retroactive recording). Optionally, the user may specify the capture setting in the command, such as the starting and ending point of the recording, and/or the quality requirement of the recording.

b. User's absence. Content capture could be triggered when the user is away from the MCD's screen. The MCD may detect the user's presence and trigger content capture when the user is absent.

c. User's status/activity. Content capture could be triggered when the user is present in front of the screen but is overlooking the content being played at the MCD. For example, the MCD may detect (e.g. through camera sensing) that the user is falling asleep or looking away from the screen and trigger content capture. On the other hand, content capture could be triggered when the user is focusing on or paying close attention to the content being played at the MCD (e.g. cheering or laughing at the screen, staring closely at the screen), since the user may be highly interested in the content and is likely to watch it again. The MCD may monitor the user's reaction to the content and trigger content capture when the user is attracted to the content. Furthermore, the user's physiological response to the content may also act as a trigger for content capture. For example, content capture could be triggered if the user's heart rate goes above a threshold.

d. User's action/input to MCD. Content capture may be triggered when the MCD receives user's input that is related to the content being played at the MCD. In addition, user may perform actions that are triggered or affected by the content being played at the MCD, and the actions usually take the form of user's input to the MCD. For example, a user may be interested in the content of more than one channels and switching among them, a recording could be triggered to capture the content on the channel that the user is not currently viewing. In another example, a user may be commenting on the content while watching a video, in which case the MCD may record the audio comments or reactions of the user and combine them with the corresponding video segment/clip.

e. User's action/input to other devices. Similar to the previous case, content played at the MCD may trigger or affect the user's actions, which are reflected as user's input to linked devices, such as typing on a tablet/phone, readings from a health monitoring device, etc. Content capture may be triggered when a linked device receives user's input that is related to the content being played at the MCD. On the other hand, the user's activity on another device may affect the user's viewing experience, which could also trigger the content capture. For example, a phone call received on a user's phone may interrupt the user's viewing and trigger content capture at the MCD.

f. User's predicted action/activity. In addition to the current activity of the user, the MCD may trigger content capture based on a predicted action or activity of the user. For example, a user has an appointment that is scheduled at the same time as one of the user's favorite TV show. The schedule information may be stored at the user's smart phone and the MCD is informed of this schedule, based on which the MCD may schedule a recording for the TV show. In this case, the user does not need to manually set a reminder for the recording, the MCD could automatically detect the time conflict and schedule the recording after the trigger is configured.

g. User's environment. The change in the user's environment for viewing or listing experience could trigger content capture. For example, the user is enjoying the climax of a movie, but is disturbed by some environmental noises, which impacts the viewing experience. Content capture could be started and last until the noises fade away.

h. User specified content. Content capture could be triggered when certain content specified by the user is detected. For example, the user may configure the MCD to record the screen when a certain object is detected, or a matching image/audio is found. Example triggers may include: voice detection of "important topic" in a lecture, audio detection of engine booming noise in auto racing, scoring scene in a sports game, etc.

i. A combination of two or more from the above. For example, a user may leave the screen when a commercial advertisement starts, recording will not be triggered in this case. If the advertisement has finished but the user is not back yet, then recording could be started.

A MCD may have more than one user. Multiple users may share the same configuration of content capture triggers or specify different sets of triggers.

Content Capture Notification

The user may specify how he/she would like to be notified when a content capture is triggered. The configuration of notification could be general or content/trigger specific. For a content-specific notification method, the user may specify the applicable content for this notification method. For a trigger-specific notification method, the user may specify the applicable triggers for this method, or specify the notification method when configuring the corresponding trigger (in the "Notification setting" element). The information elements for notification configuration are shown in Table 2.

TABLE 2

| Content Capture Notification Configuration | |
|---|---|
| Element | Description |
| Applicability | Defines what content this notification configuration may apply to. Examples include "all content", "live content", "content with lecture-tag", "content in the category of sports", "content generated by the user". |
| Notification Method | Specifies the timing of notification. Examples are shown hereinbelow. |
| Display Setting | Defines where/how the notification is displayed. For example, the user may configure the notification to be displayed at the MCD, or at a certain device, or wherever the content augmentation is performed. |
| Preview Setting | Specifies whether a preview option will be included in the notification. |

Below are several examples of notification methods.

a. A notification will be sent to the user when a trigger event is detected. The notification may ask for user's feedback of whether the corresponding content capture should be performed.

b. A notification will be sent to the user when a content capture is started. The notification may inform the user that the content is currently being recorded and display the progress of the recording. During the recording process, the user could have the option of ending the recording and/or discarding the recorded segment.

c. A notification will be sent to the user when a content capture is finished. The notification may ask the user whether a preview of the captured content is needed, whether the capture content should be played now, or whether the captured content should be saved or discarded.

d. A notification will be sent to the user when the current video session ends (e.g. end of a movie, during commercial advertisement, when user pauses the video) so that it will not interrupt the user's viewing experience.

e. Notification will not be sent. The captured content could be retrieved upon the user's request.

The user may configure the MCD to send multiple notifications regarding the same captured content at different timing. For example, the user may configure the MCD to send notifications when the content capture is triggered and when the capture (and augmentation) is completed.

Content Capture Configuration

Based on the information elements defined for content capture trigger and notification configuration, the user may send customized triggers to the MCD for content capture and configure the MCD with notification preferences. The MCD stores the triggers defined by the user and obtained from the CCA, and connects with the linked devices that are identified from the triggers. The content capture configuration procedure 200 is shown in FIG. 2.

Figure 2:
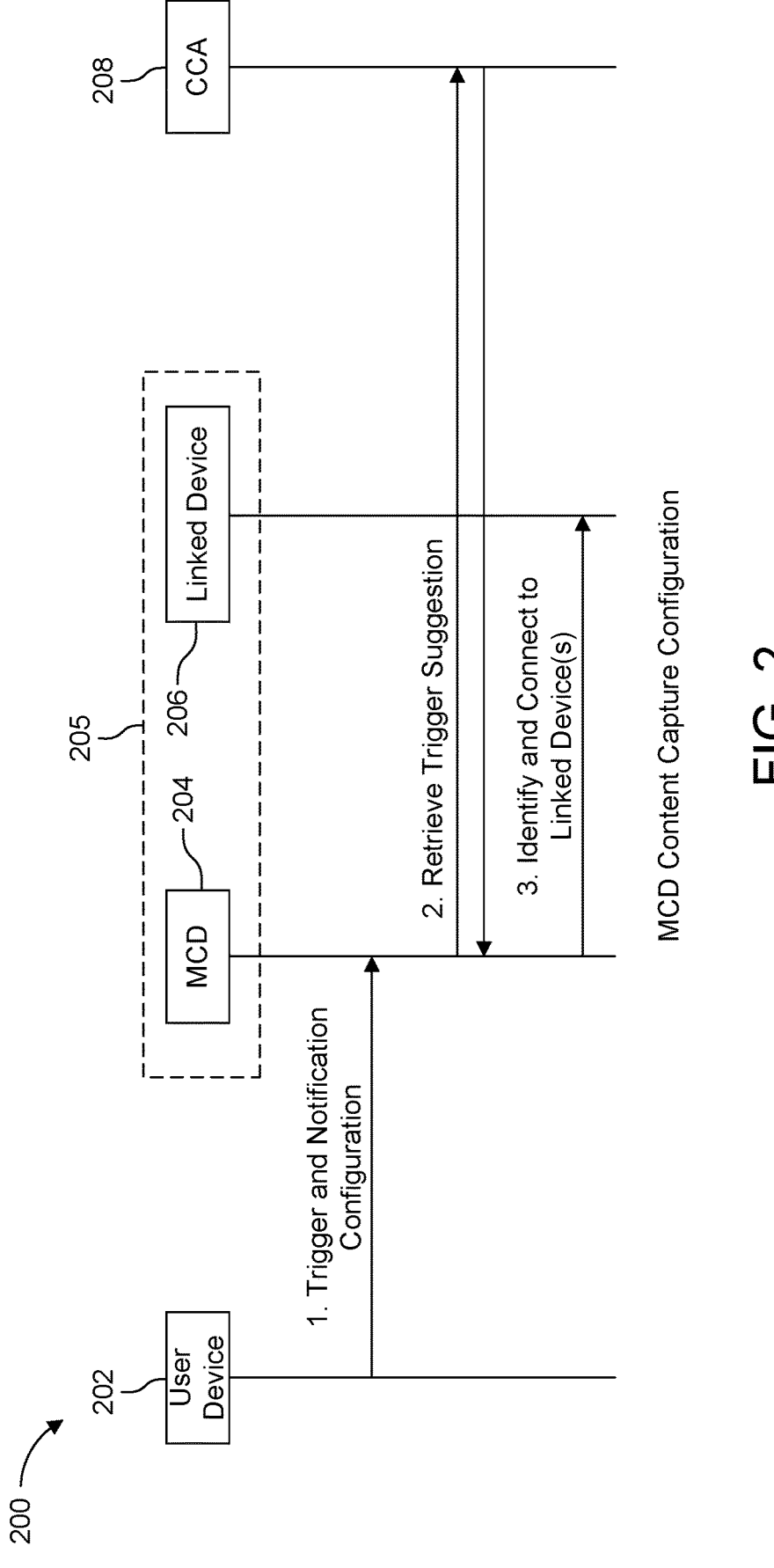
FIG. 2 depicts an example content capture configuration.

In FIG. 2 at Step 1, (Note that Step 1 and Step 2 could happen in any order) the user device 202 sends a request to the MCD 204 to configure triggers for content capture and notification method. The user may define a new trigger by specifying each element as listed in Table 1. The user could also select/enable triggers from a list of pre-defined triggers, where the pre-defined triggers are obtained through FIG. 2 Step 2. The user may configure the notification method according to Table 2.

In FIG. 2 at Step 2, the MCD 204 consults with the CCA 208 to retrieve trigger suggestions. The CCA 208 maintains the content capture history of the user(s) of the target MCD and/or other users (remote or local) of the system, based on which the CCA may infer the preference of the user and what content the user may want to capture. For example, if a movie is about to be played, the MCD 204 may query the CCA 208 to see which segment(s) are popular among users and set a trigger accordingly to record the segment(s). The MCD 204 may also obtain instructions from the CCA 208 on what information should be captured for generating augmentations with the captured segment(s). The MCD 204 may periodically check with the CCA 208 for updated trigger configurations, or send a one-time retrieval request for content specific triggers each time a new content is started.

In FIG. 2 at Step 3, after the trigger configuration from user's 202 request and CCA's 208 suggestion, the MCD 204 may identify devices that are involved in the content capture based on information indicated in the trigger, and set up connection with the devices if necessary. For example, if it is configured that content capture is triggered by detecting input from a device, then the MCD 204 may connect to the device in order to receive notification/information from the device for content capture or to send captured content to the device. For a prediction-based capture, the MCD 204 may contact the linked device 206 to obtain context information (e.g. schedule, appointment information) so that the MCD 204 may determine the schedule of the content capture.

Trigger Monitoring and Detection

After the content capture configuration, the MCD may start to monitor the trigger conditions and start/schedule content capture when a trigger event is detected. A general procedure 300 for trigger monitoring and detection is shown in FIG. 3.

Figure 3:
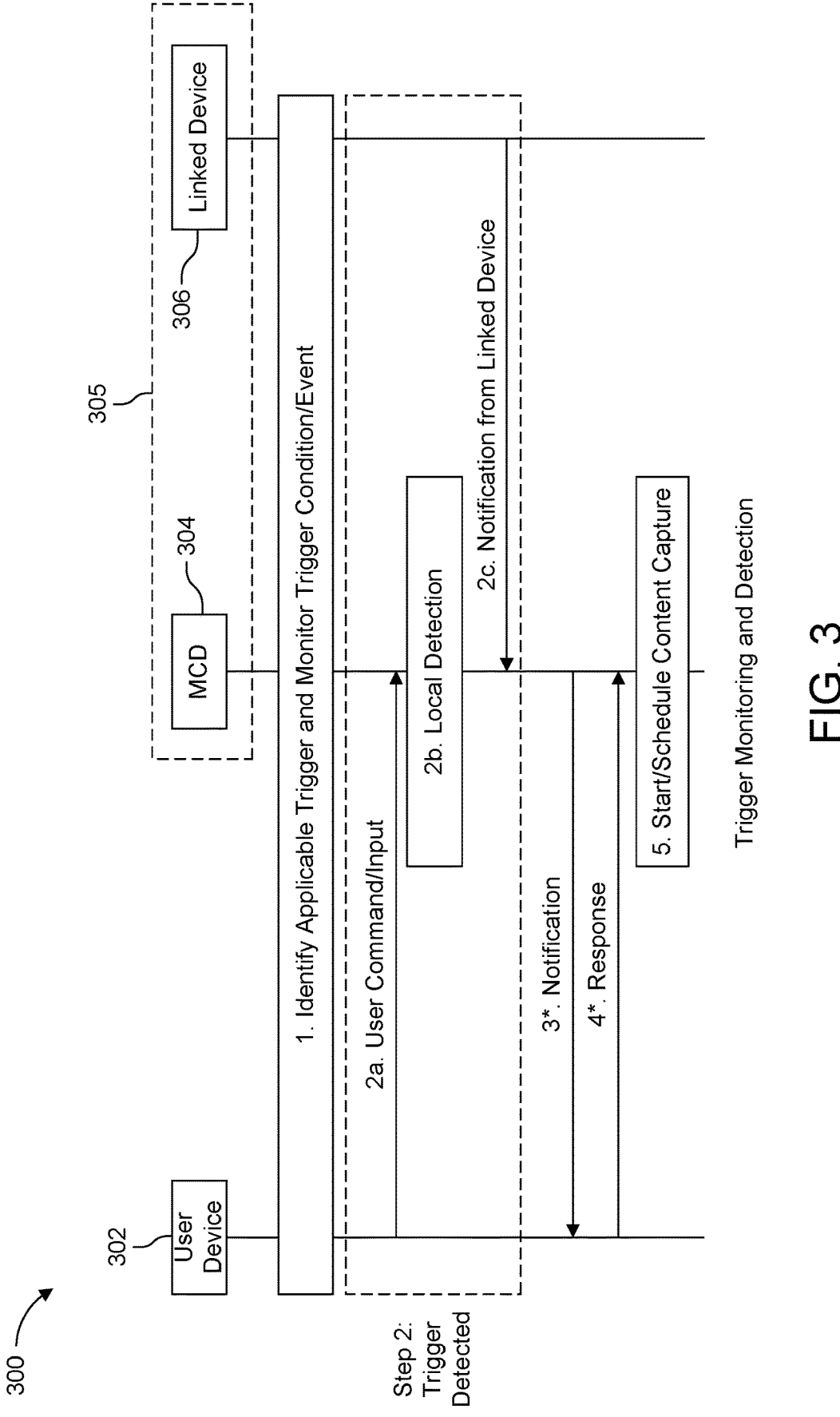
FIG. 3 depicts an example trigger monitoring and detection procedure.

In FIG. 3 at Step 1, the MCD 304 identifies the content capture triggers that are applicable to the current or to be played content, and starts to monitor the conditions and events defined in the triggers. For example, the MCD 304 may examine the currently playing content for a content-based trigger, or monitor the user's presence and/or reaction by consulting a user-faced camera, or monitor the user's focus with an eye-tracking camera. For triggers where a linked device 306 is involved, the MCD 304 may listen to notifications from the linked device 306, or receive/retrieve trigger related information (such as sensor data or response information) from the linked device 306 to determine whether a capture should be triggered. Note that the user/ environmental monitoring will be activated only when the corresponding trigger is applicable.

In FIG. 3 at Step 2, a trigger for content capture is detected. The trigger could be receiving a command from the user device 302 at Step 2a, where the user may specify the settings for this capture in the command. The trigger could also be a local decision at Step 2b, made by the MCD 304, such as detecting the audio/video input from the user device 302 through a built-in microphone/camera. In addition, the trigger could be detected at Step 2c, when receiving a notification from a linked device 306, or after processing the trigger related information received/retrieved from a linked device 306.

Considering FIG. 3 at Step 3, this step may be performed under certain configurations/conditions. For example, if the notification configuration corresponding to this trigger requires the MCD 304 to notify the user via the user device 302 when the trigger is detected, the MCD 304 will inform the user via the user device 302 that a trigger is detected, and ask the user whether the content capture should be performed. The MCD 304 may start or hold off on the capture while waiting for the response from the user device 302.

Considering FIG. 3 at Step 4, this step may be performed under certain configurations/conditions. The user device 302 may respond to the MCD 304 to proceed with the content capture or reject the capture. If the MCD 304 has started content capture (while waiting for user's response) and the user rejects the capture, the capture process will be ceased and the already captured content will be discarded.

In FIG. 3 at Step 5, the MCD 304 starts the content capture after the trigger is detected (and the user agrees to perform the content capture). The content capture may be performed based on the settings configured in the trigger. In the case that the triggered content capture is for a future time, the MCD 304 may schedule a content capture at the desired time. For example, the user made an appointment in the calendar app on his/her smart phone or laptop device 302, a notification is sent to the MCD 304 and the MCD 304 identifies a time conflict of the user's favorite show with this appointment. A content capture is triggered and the MCD 304 will schedule a recording of the show when it is broadcast.

MCD Content Capture and Augmentation

The MCD may start content capture after a trigger is detected, which is followed by content augmentation if applicable. According to the user's configuration and request, the user could be notified and the (augmented) captured content could be displayed to the user. The user's feedback to the captured content will be gathered by the MCD and shared with the CCA for analyzing the user's preference and updating trigger generation process. The procedures for content capture and augmentation may vary depending on whether input from linked device is needed and where the augmentation is performed, as shown in FIGS. 4-7. Note that some of the steps may only be executed under certain configurations or situations.

Option 1: Local Processing Without Input From Linked Device

Figure 4:
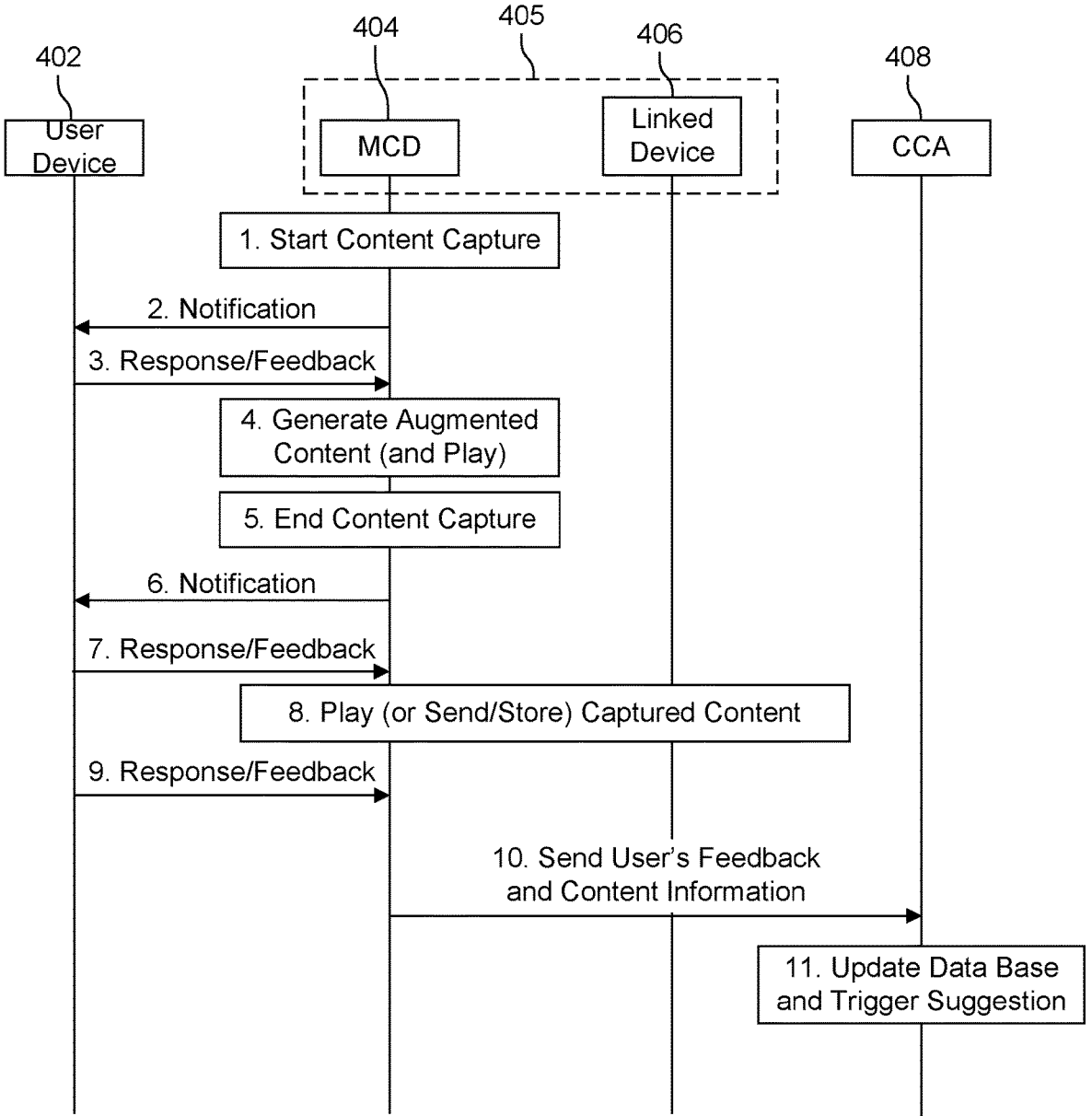
FIG. 4 depicts an example first option for content capture and augmentation.

FIG. 4 presents a basic procedure 400 for a first option of content capture. In this option, the content capture and/or augmentation is performed at the MCD locally and does not rely on the input of a linked device 406.

In FIG. 4, at Step 1, when a content capture is triggered (and the user agrees to perform the content capture), or a scheduled capture is due, the content capture process is started. At Step 2, if the user has configured that a notification should be sent when the content capture is started, then the MCD 404 may send a notification to the user device 402. The notification may indicate the capture of what content has been started. At Step 3, after being notified, the user device 402 may further instruct the MCD 404 to cease or discard an ongoing content capture by sending a response. The response could also be used by the user device 402 to instruct the MCD 404 to end the capture if the ending point is not specified previously.

In FIG. 4 at Step 4, if content augmentation is needed (which may be indicated in the "Augmentation Setting" in the corresponding trigger), the MCD 404 overlays the response information with the captured content to generate/ construct/assemble the augmented captured content such as a video clip. When adding the response information on top of (overlaying) the captured content, their timestamps are aligned and synchronized. The response information could be overlaid to the captured content as subtitles, additional audio track, or a pop-up window within the frame, depending on the type of content and response information. Optionally, the MCD may play the augmented content as it is generated (in real-time or equivalently near-real-time). Alternatively, the MCD may generate/construct/assemble augmented content after the capture process ends. At Step 5, the content capture is ended according to the capture setting, or according to the user's response in the previous step.

In FIG. 4 at Step 6, if the user has configured the MCD 404 to send the notification after the content capture, then the MCD 404 will notify the user device 402 of the captured content. Depending on the configuration, this step may happen right after the video clip is generated, or at a later time so that the notification will not disturb the user's current viewing experience. In the notification, the MCD could ask the user whether the captured content should be saved or discarded. Moreover, the MCD could ask the user whether a preview of the clip is needed so that the user could make the decision of whether the clip should be kept. At Step 7, the user device 402 responds to the MCD 404 to save, discard, or preview the captured content.

In FIG. 4 at Step 8, if the user device 402, under the control of the user, requests a preview of the (augmented) captured content as indicated in the response, the clip will be played at the MCD 404 or a linked device 406. The clip may also be played as per the user's request. Note that the device to play the captured content does not have to be the same one as the device which received user's input. Alternatively, the (augmented) captured content could be stored at the MCD 404 or sent to a linked device 406 for storage/sharing/processing.

In FIG. 4 at Step 9, after viewing the capture content, the user device 402 may be used to provide further feedback to the MCD 404, such as whether the clip should be kept, whether the captured content is desired, or an evaluation of the content capture (e.g. like, dislike, rating). At Step 10, the information of the clip, as well as the user's feedback provided in step 3 and 6 are sent to the CCA 408. Information of the clip may include what triggered this capture, the relative timestamp of the captured content (e.g. the last 10 minutes of a movie), the linked device 406 involved in the capture, the augmentation performed on the captured content, etc. At Step 11, based on the reported information from the MCD 404, the CCA 408 may update the database for user's preference, tendency of content capture, and generate/update the trigger suggestion for content capture and augmentation.

Option 2: Augmentation at the MCD With Real-Time Input Collection

Figure 5:
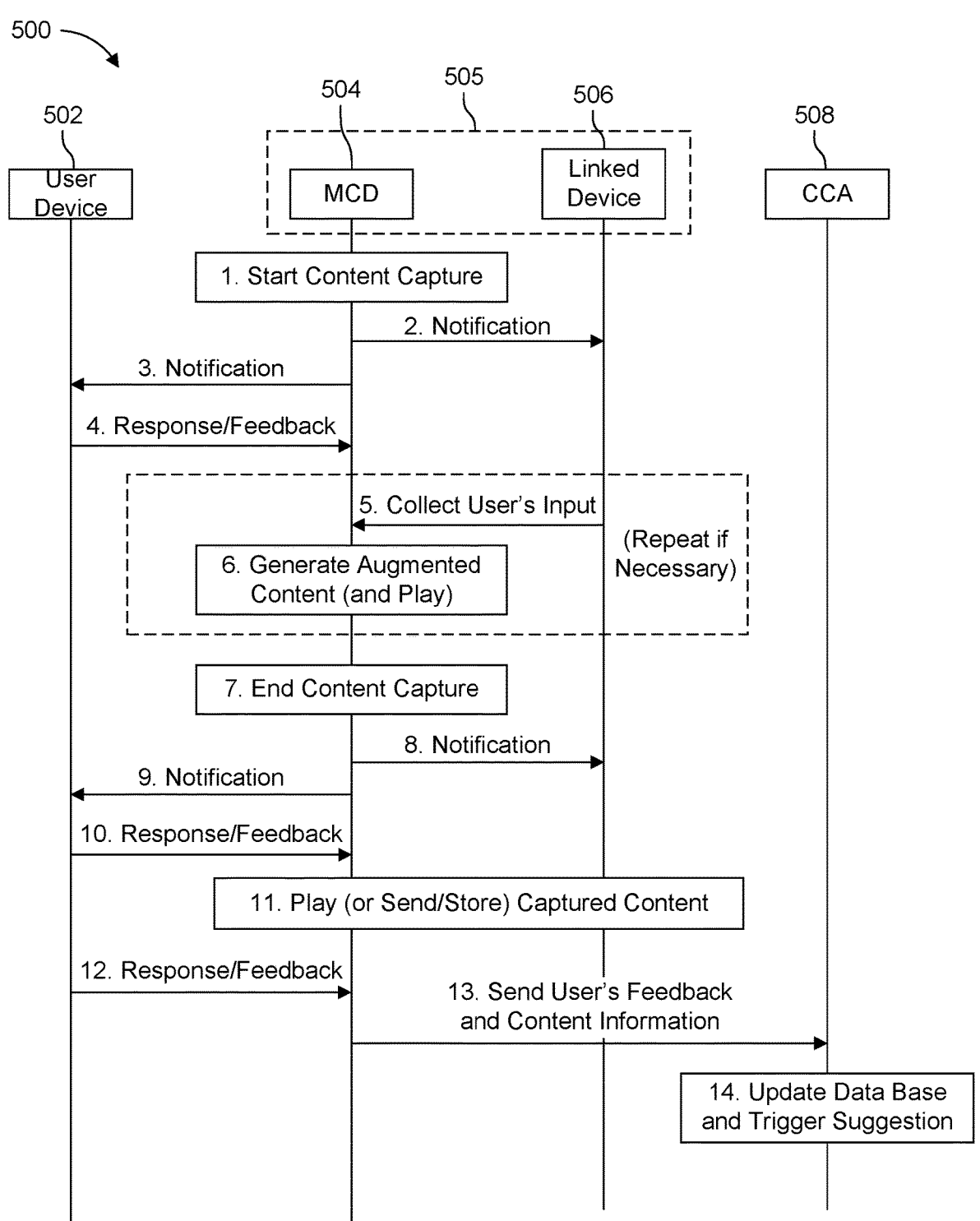
FIG. 5 depicts an example second option for content capture and augmentation.

FIG. 5 presents a basic procedure 500 for a second option of content capture. In this option, content augmentation is needed and will be performed by the MCD 504. As a result, the MCD needs to collect the user's input from a linked device to perform the augmentation. The user's input is collected simultaneously with the content capture process. In this case, the MCD is able to display the augmented captured content to the user immediately, such as in real-time or near-real-time.

In FIG. 5, at Step 1, the action may be the same as Step 1 of FIG. 4 Option 1.

In FIG. 5, at Step 2, if the content capture is to be followed by an augmentation with the response information from a linked device, the MCD 504 may send a notification to the linked device 506 indicating that the content capture has started so that the linked device may synchronize with the MCD or align the response information accordingly. The notification also serves as a request to the linked device to send the response information to the MCD.

In FIG. 5, at Step 3, the action may be similar to Step 2 of FIG. 4 Option 1. The MCD 504 may send a notification to the user device 502. The notification may indicate the capture of what content has been started, as well as the linked device 506 that is providing information for the augmentation.

In FIG. 5, at Step 4, the action may be similar to Step 3 of FIG. 4 Option 1. After being notified, the user may further instruct the MCD 504 to cease or discard an ongoing content capture by sending a response. In this case, the MCD 504 may notify the linked device 506 and stop collecting information from the linked device 506. Note that the user device 502 may send the response during Step 5 or 6.

In FIG. 5, at Step 5, the MCD 504 collects response information from the linked device 506. This step may be performed repeatedly to collect the response information in a real-time manner. Such response information may include information of a user derived reaction to a multimedia playback, information from sensors indicating a physical response of a user, information relating to the use of a companion device, and the like.

In FIG. 5, at Step 6, the action may be similar to Step 4 of FIG. 4 Option 1. The MCD 504 overlays the response information collected from the linked device 506 onto the captured content to generate/construct/assemble the augmented captured content such as a video clip. Optionally, the MCD 504 may play the augmented content as it is generated. Alternatively, the MCD may generate augmented content after the capture process ends.

In FIG. 5, at Step 7, the action may be the same as Step 5 of FIG. 4 Option 1.

In FIG. 5, at Step 8, as a follow-up of Step 2, the MCD 504 may send a notification to the linked device 506 indicating the content capture has ended.

In FIG. 5, Step 9 to 14, the action may be the same as Step 6 to 11 of FIG. 4 Option 1.

Option 3: Augmentation at the MCD With Information Collection After Content Capture FIG. 6 presents a basic procedure 600 for a third option of content capture. In this option, content augmentation is needed and will be performed by the MCD 604. As a result, the MCD 604 needs to collect the response information from a linked device 606 to perform the augmentation. The user derived response information is collected after the content capture process.

The steps are generally similar to that of FIG. 5 Option 2, except for Steps 5 to 8.

In FIG. 6, at Steps 1 to 4, the actions may be the same as Steps 1 to 4 in FIG. 5 Option 2.

In FIG. 6, at Step 5, the content capture is ended according to the capture setting, or according to the user's response via the user device 602 in the previous step.

In FIG. 6, at Step 6, as a follow-up of Step 2, the MCD 604 may send a notification to the linked device 606 indicating the content capture has ended. The notification may also function as a request to retrieve the user derived response information from the linked device for content augmentation.

In FIG. 6, at Step 7, the MCD 604 collects response information associated with the captured content from the linked device 606. The linked device 606 may indicate timestamp information in the input so that the MCD 604 could align the response information with the capture content.

In FIG. 6, at Step 8, the MCD 604 overlays the response information with the captured content to generate the augmented captured content such as a video clip.

In FIG. 6, at Steps 9 to 14, the action may be the same as Steps 9 to 14 in FIG. 5 Option 2.

Option 4: Augmentation at the Linked Device

Figure 7:
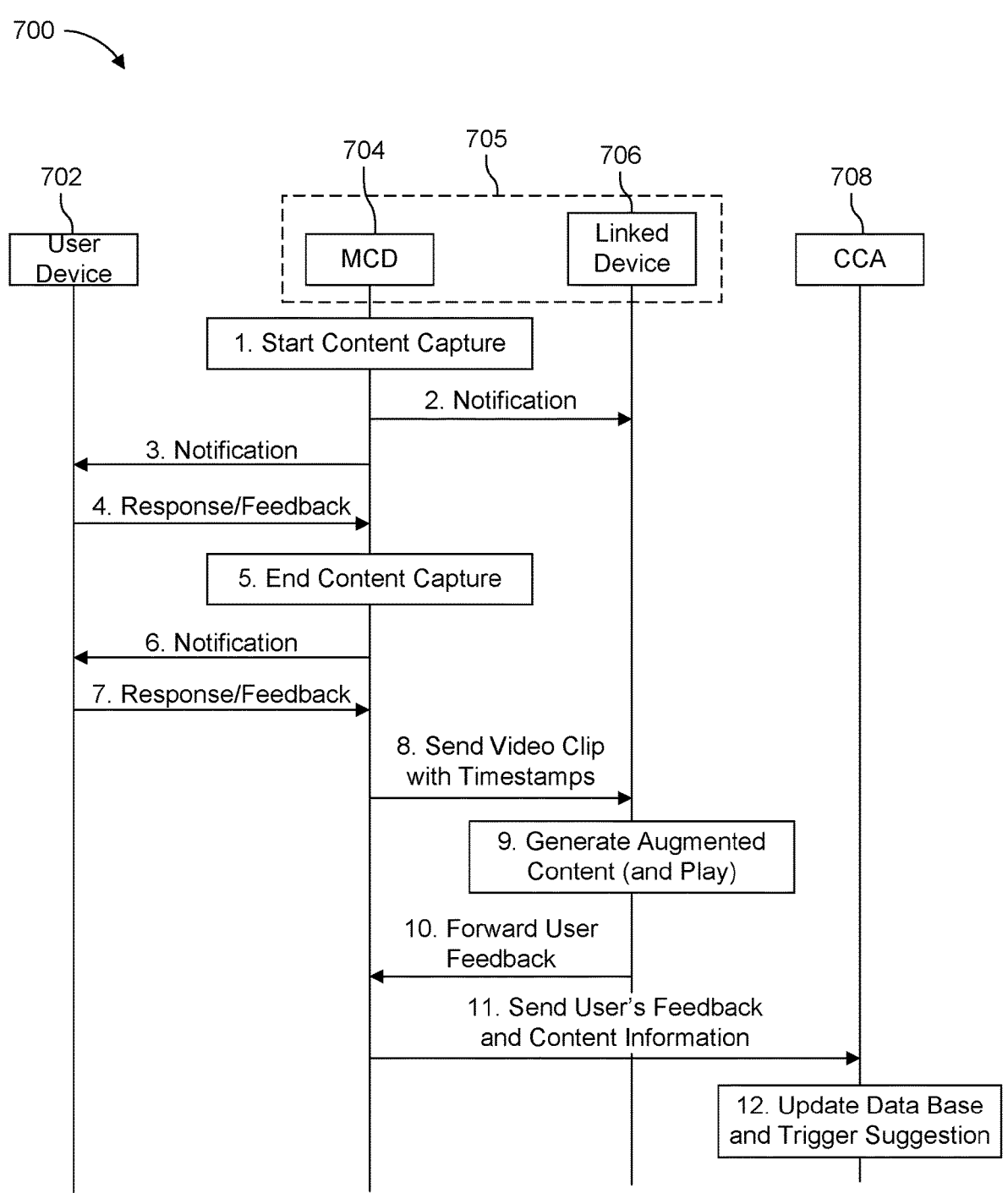
FIG. 7 depicts an example fourth option for content capture and augmentation.

FIG. 7 presents a basic procedure 700 for a fourth option of content capture. In this option, content augmentation is needed and will be performed by the linked device 706. As a result, the DTV needs to send the captured content to a linked device to perform the augmentation.

In FIG. 7, at Steps 1 to 4, the action may be the same as Step 1 to 4 in FIG. 5 or FIG. 6 Option 2 or 3 respectively.

In FIG. 7, at Step 5, the content capture is ended according to the capture setting, or according to the user's response via the user device 702 in the previous step.

In FIG. 7, at Step 6, the action may be similar to Step 9 of FIG. 5 or FIG. 6 Option 2 or 3 respectively. If the user has configured the MCD 704 to send the notification after the content capture, then the MCD 704 will notify the user device 702 of the captured content. In the notification, the MCD 704 may indicate that the content augmentation is performed at a linked device 706 so that the user could use the linked device 706 to view the (augmented) captured content.

In FIG. 7 at Step 7, the user device 702 responds to the MCD 704 to save or discard the captured content according to the user's input.

In FIG. 7 at Step 8, the MCD 704 sends the captured content to the linked device 706. The sent video clips contain timestamp information so that the device would be able to synchronize the content with the response information. This step may take place after the content capture ends (as shown in the figure) or along with the content capture (i.e. the capture content is sent to the linked device in a real-time manner). Note that if the user device 702 responds to discard the captured content in Step 7, then the MCD 704 may notify the linked device 706 of the user's decision.

In FIG. 7 at Step 9, after receiving the captured content from the MCD 704, the linked device 706 may combine response information with the content to generate/construct/assemble augmented captured content. Optionally, the linked device 706 may play the augmented captured content to the user device 702.

In FIG. 7, at Step 10, if the linked device 706 could collect user's feedback to the (augmented) captured content, the linked device 706 may send the feedback to the MCD 704. Alternatively, the linked device 706 may send the augmented captured content back to the MCD 704, and the MCD 704 may play/store/share the content and gather user's feedback.

In FIG. 7, at Step 11, the action may be the same as Steps 10/13/13 in Option 1/2/3 in FIGS. 4/5/6 respectively.

In FIG. 7, at Step 12, the action may be the same as Steps 11/14/14 in Option 1/2/3 in FIGS. 4/5/6 respectively.

Embodiments

System Level Embodiments

The proposed user aware content capture and augmentation functionality can be implemented as an application/service that is integrated in a multimedia consumption device. Various types of multimedia consumption devices may support the proposed user aware content capture and augmentation functionality discussed herein. Such devices may include but are not limited to a DTV, smart phone, tablet, laptop, smart glasses, HMD, etc. For example, the devices may support the capabilities such as monitoring multimedia content, detecting content capture event criteria, generating content capture notifications, sending content capture notifications to users, and performing content capture (and augmentation).

Additional supporting capabilities, such as monitoring and gathering user information, monitoring user's status and activity, obtaining user's viewing context, analyzing and learning content capture and augmentation preference, etc. could be provided by either media-centric or non-media-centric applications or services. These applications or services could be integrated to the same devices that are providing the core capabilities, or provided by other devices which then would interact with the media consumption devices to support the content capture and augmentation.

Figure 8:
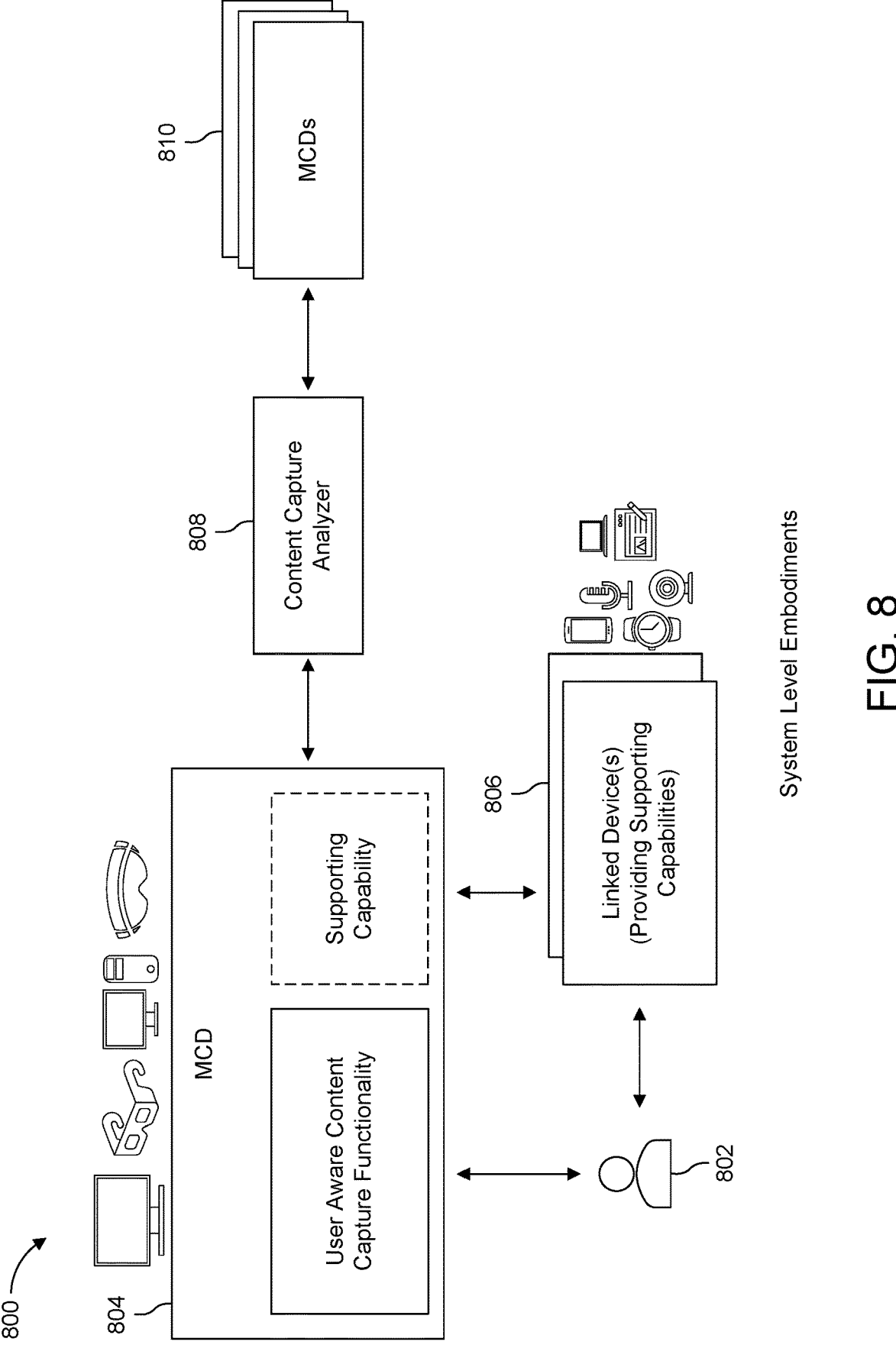
FIG. 8 depicts an example system level embodiment.

FIG. 8 captures one example embodiment of the user aware content capture and augmentation functionality discussed herein.

In FIG. 8, a media consumption device 804 is hosting an application/service that provides user aware content capture and augmentation functionality. A user 802 controlling a user device (not shown) may interact with the application/service to configure content capture trigger and notification, receive notification of content capture, and retrieve/view the (augmented) captured content.

The MCD 804 may utilize locally available supporting capability or interact with other devices to get assistance in monitoring user's status and activity to generate content capture trigger, gathering response information for augmenting captured content, or displaying/processing the captured content.

The MCD 804 may further interact with a content capture analyzer 808 to report content capture history and obtain content trigger suggestion. The analyzer 808 could be a remote entity or locally installed on the MCD 804. The content capture analyzer 808 could interact with other MCDs 810 with content capture functionality to construct a data base for learning users' general preference on content capture.

Depending on different implementation preferences or requirements, different embodiments could be achieved by adjusting the workload allocated to the MCD 804. For example, in order to minimize network communication overhead, the supporting capabilities and analytic service could be integrated to the MCD 804. In another example, for a MCD with constrained computation power, some of the supporting capabilities and the analytic capability could be offloaded to other devices and/or the cloud.

Protocol Embodiments

The disclosed content capture and augmentation may be carried out via the use of a content capture and augmentation protocol. This protocol may be supported by applications and services hosted on content consumption devices (e.g. DTVs) and other entities in the system that interact with the content consumption devices such as those shown in FIG. 8.

The applications and/or services hosted by the content consumption devices and related entities can support the exchange of content capture and augmentation protocol messages.

In one embodiment, a user aware content capture and augmentation message protocol can be realized as a client/server messaging protocol where users and/or their personal devices can function in the role of a client and/or a server to exchange user aware content capture and augmentation request and response messages with other entities in the system (e.g. Content Capture Analyzer). For example, the information elements of the user aware content capture and augmentation request and response protocol messages can be encapsulated and carried within the payloads of existing client/server protocols such HTTP or Web Sockets.

In another embodiment, these information elements can be encapsulated and carried within lower level protocols such as TCP or UDP without the use of higher layer protocols.

In another embodiment, the user aware content capture and augmentation messages can be encapsulated and carried within publish/subscribe messaging protocols. For example, entities in the system can support message broker functionality. This broker functionality can be used by the devices to exchange user aware content capture and augmentation message with other entities in the system. This exchange can be facilitated by each entity subscribing to the message broker to receive messages from other entities. Likewise, each entity can publish message to the message broker that target other entities. The information elements of the user aware content capture and augmentation message request and response protocol messages can be encapsulated and carried within the payloads of existing publish/subscribe protocols such MQTT or AMQP.

In another embodiment, the content capture and augmentation protocol may employ a combination of the aforementioned protocol types.

Various types of content capture and augmentation request and response protocol messages can be supported by applications and/or services with the content capture capability. These may include but are not limited to the types of message defined in Table 3.

TABLE 3

Content Capture and Augmentation Protocol Message Types

| Type of message | Description |
| --- | --- |
| Content Capture Trigger Configuration Request | Issued by a content capture client such as a user or application. This request is used to configure a device with the content capture trigger. The information elements contained in this request can include but are not limited to the types of information elements defined in Table 1. |
| Content Capture Trigger Configuration Response | The response that is returned to the issuer of a Content Capture Trigger Configuration Request. The information elements contained in this response can include but are not limited to a status code indicating whether the request was successfully performed as well as the information elements defined in Table 1. |
| Content Capture Notification Configuration Request | Issued by a content capture client such as a user or application. This request is used to configure the content capture notification at a device. The information elements contained in this request can include but are not limited to the types of information elements defined in Table 1. |
| Content Capture Notification Configuration Response | The response that is returned to the issuer of a Content Capture Notification Configuration Request. The information elements contained in this response can include but are not limited to a status code indicating whether the request was successfully performed as well as the information elements defined in Table 1. |
| Content Capture Trigger Retrieval Request | Issued by a content capture application or service. This request is used to retrieve content capture trigger suggestion from an analytic application or service. The information elements contained in this request can include but are not limited to: Identifier of the device hosting the content capture application/service. Identifier of a content capture client associated with the device. Type/identifier of content. |
| Content Capture Trigger Retrieval Response | The response that is returned to the issuer of a Content Capture Trigger Retrieval Request. The information elements contained in this response can include but are not limited to a status code indicating whether the request was successfully performed as well as the information elements defined in Table 1. |

TABLE 3-continued

Content Capture and Augmentation Protocol Message Types

| Type of message | Description |
| --- | --- |
| Content Capture Notification | Issued by a content capture application or service. This notification is used to notify the content capture client that a content capture and/or augmentation is triggered or completed. The notification may include description of the trigger, description of the captured and/or augmented content, options of how to process the captured content, as well as other information that is elaborated in hereinabove. |
| Content Capture Response | The response that is returned to the issuer of a Content Capture Notification. The response may include user's feedback to the corresponding capture and/or augmentation, user's instruction on how to process the captured content, as well as other information that is elaborated in hereinabove. |
| Content Capture Analysis Request | Issued by a content capture application or service to an analytic application or service to report a content capture or request updates/suggestions of content capture trigger. The request may include identifier of the device hosting the content capture application/service, the identifier of the corresponding client, description of a content capture performed by the application/service, as well as other information that is elaborated in hereinabove. |

FIG. 9 depicts an example flow diagram of a general method according to aspects of the disclosure. It is noted that features of FIGS. 1 through 7 may be combined unless specifically disallowed in the respective descriptions herein. The procedure 900 of FIG. 9, is primarily performed by an electronic device, a first electronic device, such as a MCD. At 905, the device is configured to monitor for an indication, such as a trigger indication, to start a capture of multimedia data (multimedia content) received by the MCD.

At 910, the electronic device detects an indication to begin capture of multimedia data. Detecting the indication may include detecting at least one of a condition detected by the electronic device and/or a notification of a condition from a second device, such as a linked device. Such a notification is described in FIG. 3. In one variation, the condition detected by the electronic device may be one of a user input command from a user device or a detection of a trigger condition detected internally by the electronic device, such as the MCD. In another variation, the notification of a condition from a second device may be a notification of a trigger condition from a linked device. The linked device may be part of an electronic device, such as part of a MCD as described above, or a sensor that is part of a second device, such as a companion device or other consumer device. Thus, at 910, the first electronic device receives from a second electronic device an indication of an occurrence of one or more trigger conditions for content capture of multimedia content displayed on the first device.

At 915, the electronic device, such as a MCD, may optionally provide a trigger indication notification to a user. In one variation, the user may respond to the notification to confirm the trigger. At 920, the electronic device may start the multimedia data capture in response to the trigger condition indication. This may involve either displaying the data while capturing (buffering/saving) the data. At 925, the electronic device collects information from a third device, wherein the information from the third device is response information that is user derived and related to the multimedia content displayed on the first device. The third device may also be a linked device that can detect and provide information regarding a user response to the multimedia data being captured. Thus, at 925, the first device collects information from a third device, wherein the information from the third device is response information that is related to the multimedia content displayed on the first device. At 930, the response information that is collected is augmented to the multimedia content for simultaneous display of both the multimedia content and the response information. Augmenting the multimedia data may be performed at the electronic device or may optionally be requested to be performed at the linked second device. One example of augmentation is the overlay of audio or video provided by response information, such as a response that is user-derived or generated by a user while viewing multimedia content, onto the captured multimedia data or content. One example is the overlay of a subtitle onto captured video multimedia content. In one variation, overlaying a user's audio or video input into the captured multimedia data/content may include overlaying either during a content capture time period or after a content capture time period.

At 935, the electronic device may optionally provide a notification of the captured content. The notification may be presented to a user. At 940, the electronic device may provide a display or playback of the augmented multimedia content. It is noted that this display of the augmented multimedia content may occur during the period of multimedia data capture or it may occur after the end of the multimedia data capture. The electronic device, a first device, may display the augmented multimedia content on a connected (internal or external) display screen. Alternately, the electronic device may enable or provide for the augmented multimedia content to be displayed on a linked device. Such provision may simply be access to a display screen in either the first device or a linked device.

At 945, the electronic device may transmit information to be used by a captured content analyzer (CCA). This transmission may include a user's feedback as well as content information. The electronic device may then later receive, from the CCA an update to an indication to begin content a multimedia data capture. Essentially, this feedback mechanism allows the CCA to provide recommendations for trigger conditions which are responsive to the user's feedback. Thus, the electronic device may receive at least one trigger condition update for the electronic device to use to capture multimedia content.

The electronic device performing the example method 900 of FIG. 9 may be one of, but not limited to, a digital television, a head-mounted device, a personal computer, a tablet computer, or a smart phone.

As discussed herein, several desirable features that enable automated user aware content capture and augmentation may be implemented. A summary of these desirable features is provided below.

A media consumption device (MCD) may support user aware content capture functionality capable of:

A. Receiving a Request to Configure Content Capture Trigger for a User.
    i. Where the trigger may specify the applicable content for capture, the condition or event of the trigger, the device(s) involved in the content capture and/or augmentation, the configuration of the capture and/or augmentation, the notification and display setting associated with the capture and/or augmentation.
    ii. Where the trigger condition/event may be based on:
        1. User's command.
        2. User's absence.
        3. User's status or activity.
        4. User's action or input to the MCD.
        5. User's action or input to other devices.
        6. User's predicted action or activity.

7. User's Environment (for viewing or listening experience).
        8. User specified content.
        9. A combination of two or more from the above.

B. Receiving a Request to Configure Content Capture Notification for a User,
    i. Where the configuration may specify the applicability of the configuration, the method of notification (timing of notification), the display setting for the notification (where and how the notification is displayed), the preview setting of the notification (whether a preview option will be included in the notification).
    ii. Where the notification method could be:
        1. sending notification right after trigger detected.
        2. sending notification when content capture is started.
        3. sending notification when content capture and/or augmentation is completed.
        4. at the end of the video segment (to not interrupt the viewing experience of the user).
        5. no notification should be sent, captured content is retrieved upon user's request.

C. Retrieving Trigger Suggestion From an Analytic Service,
    i. Where the trigger suggestion could be generated based on user's content capture history, and other users' content capture history.

D. Identifying and Connecting With one or More Linked Devices That may be Involved in the Content Capture Based on the Configured or Suggested Trigger.
    i. Where the linked device may generate the trigger for content capture, or provide user's input for content augmentation, or display/process/store the captured content.
    ii. Where the linked devices could be indicated in the trigger.
    iii. Where the MCD may configure the linked device to send a notification when a trigger event happens.
    iv. Where the MCD may obtain user's information from the linked device to predict user's activity/absence as the trigger of content capture.

E. Monitoring Content Capture Trigger.
    i. Where the MCD may collect trigger related information (such as user's status, activity, input) locally or retrieve trigger related information from a linked device.

F. Detecting a Content Capture Trigger.
    i. Where the trigger could be detected by the MCD based on local information or information retrieved from a linked device, or by receiving a notification from a linked device.
    ii. Optionally, after a trigger is detected, the MCD may send a query to the user asking whether content capture should be started.

G. Perform Content Capture and/or Augmentation.
    i. Where the augmented content could be generated at the MCD by collecting user's input locally or from the linked device and overlaying the input to the captured content.
    ii. Where the MCD may instruct a linked device to generate the augmented content by sending the captured content with timestamp information to the linked device.

H. Notifying the User of the Content Capture and/or Augmentation.
    i. Where the notification may include a query of whether the (augmented) captured content should be saved, deleted, previewed, or played.
    ii. Optionally, the (augmented) captured content may be played/displayed at the MCD or a linked device.

I. Receiving Response/Feedback From the User Regarding the (Augmented) Captured Content i. Where the response may include to save or delete the (augmented) captured content, user's evaluation of the (augmented) captured content (e.g. like, dislike, rating).

Figure 10:
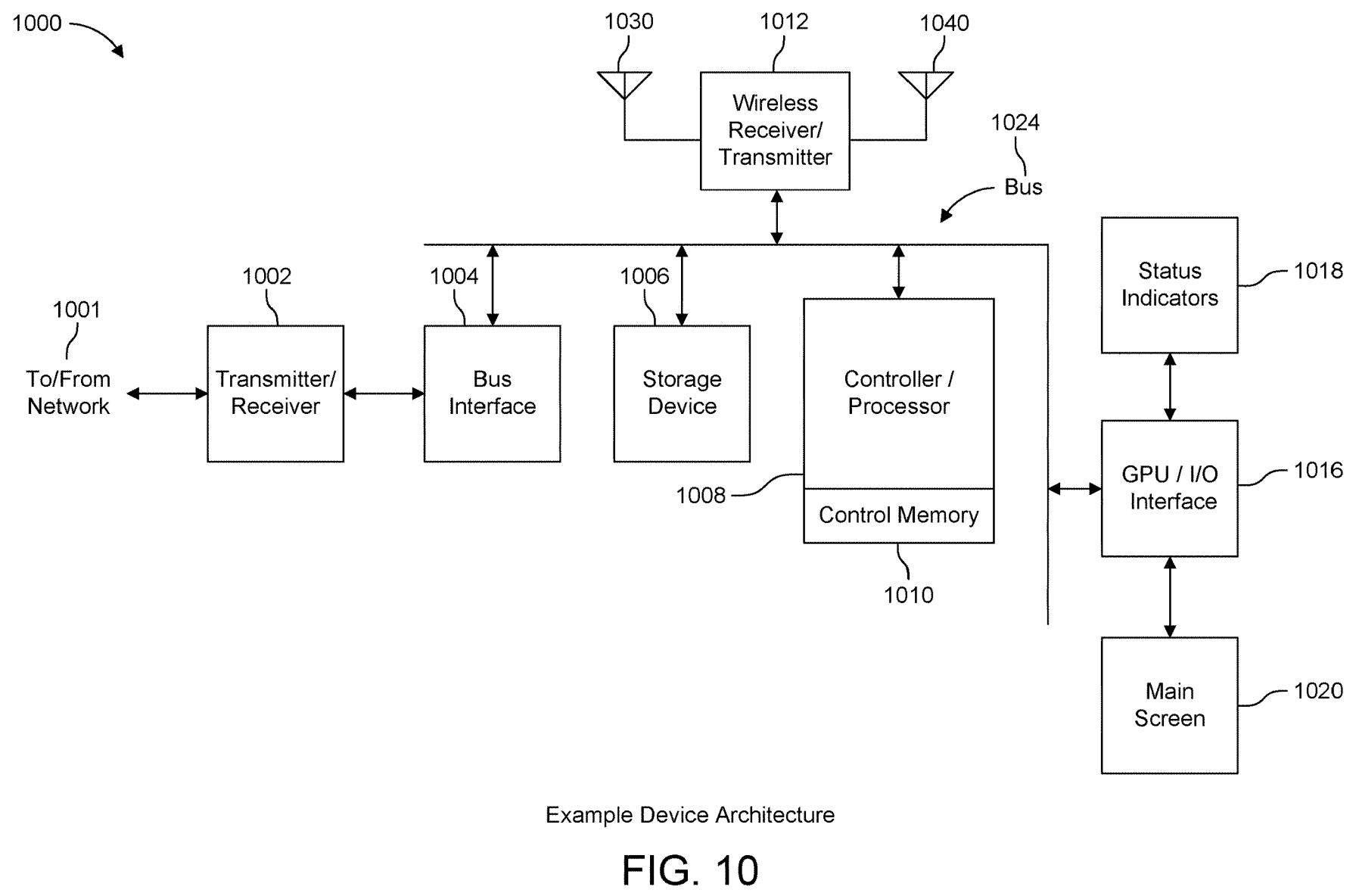

J. Send the User's Response and the Information of the Captured Content to the Analytic Service i. Where information of the captured content may include 1. the corresponding trigger of the capture 2. timestamp of the captured content 3. the corresponding linked device 4. the augmentation performed on the captured content FIG. 10 is a depiction of an example content capture and/or augmentation device architecture 1000, such as for a DTV, laptop computer, desktop computer, mobile phone, tablet computer and the like configured to perform the method of FIG. 9. The architecture of FIG. 10 may represent the electronic device of a MCD or a linked device. The apparatus of FIG. 10 can be either a special-purpose machine, or part of a larger machine that performs other tasks. For example, the apparatus of FIG. 10 can be part of a DTV, laptop computer, desktop computer, and the like or an access point or an access point capable device that can support a wireless local area network and a display for a user to interact with content. Such a machine may be configured to act as an interactive device.

The apparatus 1000 of FIG. 10 includes a transmitter/receiver interface 1002 providing connectivity to an IP network to receive digital content. The interface 1002 connects to the bus interface 1004 which allows access to the internal bus 1024. Other non-bus implementations are also possible as is well known to those of skill in the art. Present on bus 1024 are a storage device 1006 which can be used for any general storage such as retrieved or requested data and network management data, parameters, and digital content, and executable software instruction programs. Storage device 1006 may also serve as disk or solid-state storage for the information collected as displayable digital content. Main executable programs, utility and other programs may be under the control of controller/processor 1008. Also possible, but not shown are one or more interfaces for an external storage device to store captured content and for other storage purposes.

The controller/processor 1008 may be a single processor or a multiplicity of processors performing the tasks of digital content data acquisition, user interface control, and resource management. Controller/processor 1008 can perform the method described in FIG. 10. Control memory 1010 may also supply program instruction and configuration control for controller/processor 1008. The status indicators 1018 are a user interface and allows a user, system owner, or system manager to see a status of the apparatus 1000. Such indicators may include a display, LEDs, speaker, and the like. A graphical processing unit (GPU) and input/output (I/O) interface 1016 allows the device to connect to a main display screen 1020 that may be used to display digital content on the device 1000. The I/O interface 1016 may also include a be a hardline interface, such as an Ethernet interface for a local area network or may be an HDMI interface for the main screen 1020. Other options for the I/O interface are a RF or IR interface for a remote control of the apparatus 1000. Another option of I/O interface 1016 is an interactive interface which may include the use of a separate display device (another secondary device), key board, mouse, light pen, and the like.

Apparatus 1000 has a wireless network interface 1012 which allows access to and from wireless devices, such as linked devices. The wireless linked devices may be those that are known and registered to a WLAN of the apparatus 1000. Such an interface 1012 includes all elements to control a wireless network, including the use of wireless network protocols such as IEEE 802.XX, Bluetooth, other near field protocols, and the like for communication between the apparatus 1000 and receiving viewer devices.

As can be appreciated by one of skill in the art, combinations of features of various utilizations of the current disclosure can be combined unless otherwise specifically stated. Thus, features of the various figures may easily be combined. For example, a setup or configuration of a function described herein may be generated for a MCD such that a MCD content-aware operation is performed for a viewer using either or both of a personal device, a secondary device, or a hologram concurrently. In that instance the viewer may also invoke a MCD content-aware operation request for a second (or more) viewer to share the viewing MCD experience. Combining features described in this disclosure is within the scope of the concepts presented herein. Such combinations of concepts and features are considered viable embodiments unless otherwise restricted if indicated herein.

The implementations described herein may be implemented in, for example, a method or process, an apparatus, or a combination of hardware and software. Even if only discussed in the context of a single form of implementation (for example, discussed only as a method), the implementation of features discussed may also be implemented in other forms. For example, implementation can be accomplished via a hardware apparatus, hardware and software apparatus. An apparatus may be implemented in, for example, appropriate hardware, software, and firmware. The methods may be implemented in, for example, an apparatus such as, for example, a processor, which refers to any processing device, including, for example, a computer, a microprocessor, an integrated circuit, or a programmable logic device.

Additionally, the methods may be implemented by instructions being performed by a processor, and such instructions may be stored on one or more processors or computer-readable media such as, for example, an integrated circuit, a software carrier or other storage device such as, for example, a hard disk, a compact diskette ("CD" or "DVD"), a random-access memory ("RAM"), a read-only memory ("ROM") or any other magnetic, optical, or solid-state media. The instructions may form an application program tangibly embodied on a computer-readable medium such as any of the media listed above or known to those of skill in the art. The instructions thus stored are useful to execute elements of hardware and software to perform the steps of the method described herein. In this disclosure, the computer-readable media is useful to instruct either and/or both the first processor and the second processor to perform the steps of the method disclosed herein.

The invention claimed is:

1. A method performed by a first electronic device, the method comprising:

receiving from a second electronic device an indication of an occurrence of one or more conditions for content capture of multimedia content displayed on the first electronic device;

starting capture of the multimedia content in response to the indication;

collecting response information from a third electronic device, wherein the response information is generated at the third electronic device as a reaction to the multimedia content displayed on the first electronic device;

augmenting the captured multimedia content with the collected response information from the third device for simultaneous display; and providing for display of the augmented multimedia content.

2. The method of claim 1, wherein collecting response information from a third electronic device further comprises collecting information of a user's response to viewing the multimedia content displayed on the first electronic device.

3. The method of claim 2, wherein collecting information from the third device of response information comprises collecting any of notes, sensor readings, motions, video, or audio in response to the multimedia content displayed on the first electronic device.

4. The method of claim 3, wherein collecting information from the third device further comprises receiving timestamp information to align the response information with the captured multimedia content.

5. The method of claim 1, wherein receiving from a second electronic device an indication of an occurrence of one or more conditions comprises receiving any of: a user command, a user physical absence from a media consumption device (MCD), a user's status or activity, a user's input to the first or second electronic device, a user's predicted physical absence from the MCD, a user's environment, and a user's specified content occurrence.

6. The method of claim 1, wherein augmenting the captured multimedia content with the collected response information is performed according to an augmentation setting that defines a combination of the response information with the multimedia content.

7. The method of claim 6, wherein the combination of the response information with the multimedia content comprises an overlay of any of video and audio with the multimedia content.

8. The method of claim 1, wherein providing for display of the augmented multimedia content comprises providing a rendering on either the first electronic device or the third device for playback immediately or at a later time.

9. The method of claim 1, further comprising collecting feedback information from a user and updating the conditions based on the collected feedback.

10. An electronic device, comprising at least one processor and circuitry configured to:

receive from a second electronic device an indication of an occurrence of one or more conditions for content capture of multimedia content displayed on the electronic device;

start capture of the multimedia content in response to the indication;

collect response information from a third electronic device, wherein the response information is generated at the third electronic device as a reaction to the multimedia content displayed on the electronic device;

augment the captured multimedia content with the collected response information from the third device for simultaneous display; and provide for display of the augmented multimedia content.

11. The electronic device of claim 10, wherein the electronic device collects response information of a user's response to viewing the multimedia content displayed on the electronic device.

12. The electronic device of claim 10 comprising one or more a digital television, head-mounted device, personal computer, a computer tablet device, and a smart phone.

13. The electronic device of claim 10, wherein the electronic device receives an indication of one or more conditions for content capture via any of a user command, a user physical absence from a media consumption device (MCD), a user's status or activity, a user's input to the electronic device or second electronic device, a user's predicted physical absence from the MCD, a user's environment, and a user's specified content occurrence.

14. The electronic device of claim 10, wherein the electronic device collects, from the third electronic device, response information comprising any of notes, sensor readings, motions, video, or audio in response to the multimedia content displayed on the electronic device.

15. The electronic device of claim 14, wherein the electronic device augments the captured multimedia content with the response information according to an augmentation setting that defines a combination of the response information with the multimedia content.

16. The electronic device of claim 15, wherein the augmentation setting comprises information of an overlay of any of video and audio with the multimedia content.

17. The electronic device of claim 14, wherein the electronic device further collects timestamp information to align the response information with the captured multimedia content.

18. The electronic device of claim 10, wherein the electronic device provides for display of the augmented multimedia content for rendering on either the electronic device or the third electronic device for playback in real-time or at a later time.

19. The electronic device of claim 10, wherein the electronic device is further configured to collect feedback information from a user and update the conditions based on the collected feedback.

20. The electronic device of claim 10, wherein the electronic device is configured such that the second or the third electronic device could be a sensor or sensing device, and the electronic device and the second electronic device are combined into a single device or the second electronic device and the third electronic device are combined into a single device.

* * * * *